ns Patent Office 3,098,690
Patented July 23, 1963

3,098,690
PROCESS FOR UNION DYEING OF ACRYLONITRILE POLYMERS AND BASIC NITROGENOUS FIBER BLENDS
Thomas H. Guion, Decatur, Ala., assignor, by mesne assignments, to Monsanto Chemical Company, a corporation of Delaware
No Drawing. Filed Oct. 25, 1954, Ser. No. 464,629
13 Claims. (Cl. 8—21)

This invention relates to a process for union dyeing of blends of acrylic fibers with basic nitrogenous fibers and more particularly, it relates to a method of union dyeing blends of fibers containing acrylonitrile and certain basic monomers in polymeric form with basic nitrogenous fibers by means of dyestuffs normally used for dyeing wool.

It is well known that polyacrylonitrile and copolymers of acrylonitrile and other mono-olefinic polymerizable monomers are excellent fiber-forming materials. The polyacrylonitrile and copolymers of more than 80% of acrylonitrile and up to 20% of other polymerizable monomers produce fibers with superior tensile properties, desirable elongation, and excellent stability under a wide range of physical and chemical conditions. The presence of the aforementioned desirable properties in acrylic fibers makes them admirably suited for blending with other textile fibers, both natural and synthetic. This is particularly true in respect to blends of acrylic fibers with basic nitrogenous fibers such as wool, silk, regenerated proteins, and polyamide fibers such as nylon. However, acrylic fibers consisting of polyacrylonitrile and copolymers of more than 80% of acrylonitrile and up to 20% of other polymerizable monomers suffer from inherent disabilities which greatly restrict their utility in the fabrication of blends with other fibers such as the basic nitrogenous fibers mentioned above. For example, such acrylic fibers lack affinity for most classes of common dyestuffs employed for the basic nitrogenous fibers. This disability to dye to deep and fast colors by conventional dyeing techniques has deterred the wide scale use of acrylic fibers in blends with the natural and synthetic basic nitrogenous fibers because of the inability to union dye such fiber blends to the same depth of shade by conventional dyeing procedures.

The dye-receptivity of acrylonitrile polymers has been greatly improved by utilizing as the comonomer certain basic compounds, particularly heterocyclic compounds containing a tertiary nitrogen in the ring and substituted with a polymerizable alkenyl group. Still further improvement in dye-receptivity and other properties of acrylonitrile fibers have been effected by blending polymers or copolymers of acrylonitrile containing at least 80% of acrylonitrile in polymeric form with a second copolymer containing at least 30% of a basic monomer which is preferably a heterocyclic compound containing a tertiary nitrogen atom in the ring and a polymerizable alkenyl group substituted thereon. These blends may have as the principal polymer from 70 to 98% of a copolymer of 80 or more percent acrylonitrile and minor proportions of monomers copolymerizable therewith. The other blend constituent is a polymer of 30 or more percent of the basic monomer and up to 70% of another copolymerizable monomer. The two components of the blended copolymers are proportioned so as to provide from 2 to 10% of the basic monomer in polymerized form in the final blend.

The present invention is applicable to blends of basic nitrogenous fibers with acrylic fibers in which the acrylic fibers are polymer blends wherein the principal acrylonitrile polymer, present to the extent of 70 to 98% by weight, is one of 80 or more percent of acrylonitrile and minor proportions of monomers copolymerizable therewith. The other component of the acrylic fiber blend is a polymer of 30 or more percent of a vinylpyridine or alkyl substituted vinylpyridine and up to 70% of another copolymerizable monomer. The components of the blended polymers are proportioned so as to provide a total of at least 80% acrylonitrile and from 2 to 10% of a vinylpyridine, both in polymeric form, in the blended acrylic fiber composition.

Useful vinylpyridines for the preparation of the blending composition are vinylpyridines or alkyl substituted vinylpyridines, for example 2-vinylpyridine, 3-vinylpyridine, 4-vinylpyridine, 2-vinyl-5-methylpyridine, 2-vinyl-5-ethylpyridine, 2-vinyl-4-methylpyridine, 3-vinyl-5-ethylpyridine, and any other vinylpyridine containing alkyl substituents wherein the alkyl radical has up to 4 carbon atoms.

Dyeable blended acrylic copolymers may have in addition to the functional components, acrylonitrile and a vinylpyridine, one or more components derived from non-functional monomers present as a comonomer with acrylonitrile in the principal polymer or as a comonomer with a vinylpyridine in the blending polymer. Among the useful monomers for copolymerization with acrylonitrile to form the fiber-forming polymers may be mentioned vinyl acetate and other vinyl esters of mono-carboxylic acids having up to 4 carbon atoms, methyl methacrylate, and other alkyl methacrylates having up to 4 carbon atoms in the alkyl radical, methyl acrylate and other alkyl acrylates having up to 4 carbon atoms in the alkyl group, dimethylfumarate and other dialkyl fumarates having up to 4 carbon atoms in the alkyl groups, dimethyl maleate and other dialkyl maleates having up to 4 carbon atoms in the alkyl groups, styrene, alpha-methyl styrene, and other vinyl or isopropenyl substituted aromatic hydrocarbons, vinyl chloroacetate and other vinyl esters of halo-substituted acetic acids, vinylidene chloride, vinyl chloride and methacrylonitrile. Useful monomers for polymerization with the basic vinylpyridine monomers are styrene, alpha-methyl styrene, vinyl chloride, vinylidene chloride, vinyl acetate, acrylonitrile, methacrylonitrile, acrylic acid, methacrylic acid, the alkyl acrylates, the alkyl methacrylates, vinyl ethers, alkyl crotonates, the alkyl maleates, and the alkyl fumarates. Since the copolymers of the basic monomers with acrylonitrile have good thermal stability and solvent resistance, these copolymers are usually preferred for the incorporation of the basic monomer in the polymer blend.

Although as previously mentioned, incorporation of the dye-receptive monomers has enabled the production of fibers having greatly improved dye-receptivity, it has still not resulted in the production of acrylic fibers which may be union dyed in blends with basic nitrogenous fibers by means of the usual classes of wool dyes employing ordinary dyeing techniques. With wool blends, the problem has been chiefly to raise the relative affinity of the acrylic fibers so that good union could be achieved. Wool has a greater affinity for most types of wool dyestuffs than even the modified acrylic fibers contemplated by this invention, so that union dyeing, especially in the medium and heavy shades, has not been practicable. The same problem of greater affinity for wool-type dyes has existed in the case of blends with other basic nitrogenous fibers such as silk, regenerated protein, and the polyamide fibers such as nylon.

Methods have been proposed for increasing the affinity of the acrylic fibers for certain types of the wool dyes such as the method of pretreatment of the acrylic fibers in baths of acid as set out in copending Serial No. 386,137, filed October 14, 1953, now U.S. Patent 2,932,550. However, this method has results in increasing the affinity for only certain members of one class of wool dyes, the acid wool dyes, and has not enabled the use of the several other very effective classes of wool dyes such as chrome dyes, metallized acid dyes, weak acid dyes, and premetallized neutral dyes. Consequently, the ranges of shades and suitable dyestuffs useful in dyeing unions of acrylic fibers with basic nitrogenous fibers have in the past been severely limited.

It is, accordingly, the primary object of this invention to provide a method whereby blends of one or more basic nitrogenous fibers with acrylic fibers containing at least 80% by weight of acrylonitrile in polymeric form and from 2 to 10% of a vinylpyridine in polymeric form may be union dyed with any of the commonly used wool type dyestuffs. Another object of this invention is to provide a method for such union dyeing which may be employed with either yarns or fabrics comprising a blend of the basic nitrogenous fibers and the particular acrylic fibers set out above. Still another object of this invention is to provide a method for such union dyeing of the above cited fiber blends by the conventional one-bath wool dyeing processes. Other objects of the invention will become apparent from the description hereinafter.

I have found that the above objects can be accomplished by a method of union dyeing blends of fibers containing at least 80% by weight of acrylonitrile in polymeric form and from 2 to 10% of a vinylpyridine in polymeric form with basic nitrogenous fibers which comprises subjecting the blend to the action of a dyebath containing a wool type dye, an acid, and a cationic surface active agent.

All cationic surface active agents known to be useful as dyeing assistants may be employed in my process. However, I have found certain of the cationic surface active agents to be particularly useful. Those cationic surface active agents found to be particularly suitable include those of the alkylol higher alkyl guanidine salt type, such as $N'$-ethanol-$N^3$-dodecyl guanidine acetate, the higher alkylated guanidine salt type, such as the condensation product of ethylene oxide with dodecyl guanidine bicarbonate, the higher alkyl N-substituted morpholines, such as N-cetyl-N-ethylmorpholinium ethosulfate, and ethylene oxide condensed with higher alkyl amines or amides of higher fatty acids, such as ethylene oxide condensed with oleyl amine or with stearic amide. The cationic surface active agent may be employed in amounts of from about 0.5% to about 100% based on the weight of the fibers treated. However, when the higher percentages of cationic surface active agents within this range are employed, the full exhaustion of the dyestuff upon the fibers is retarded and in some cases prevented altogether. Therefore, I prefer to use a cationic surface active agent in an amount from about 0.5% to about 10% of the weight of the fiber treated.

Though it is not desired to limit the present invention by any theory of action, it seems probable that the cationic surface active agent serves at least two purposes in the dyebath. The agent seems to act to retard the exhaustion of the dyestuff onto the basic nitrogenous fibers. But, more important is its action in causing a transfer of the dyestuff from the basic nitrogenous fibers to the acrylic fibers near the boil. The manner in which this transfer of dyestuff is accomplished is not clearly understood, but the result is a surprising ability to union dye blends of acrylic fibers and the basic nitrogenous fibers which was not possible with the several classes of wool dyestuffs by the known dyeing techniques for the basic nitrogenous fibers.

With certain of the common wool type dyes the use of cationic surface active agents alone has proved to be impracticable because of the formation of deposits of scum causing streaky and uneven dyeing on the fibers or fabrics treated. Therefore, when using certain cationic agents with certain of the common wool type dyes, particularly the chrome, metallized acid and pre-metallized neutral dyes, I have found it necessary to include in the dyebath a non-ionic surface active agent containing condensation products of polyglycols with higher fatty acids, higher fatty alcohols, amides of higher fatty acids, or long chain alkyl substituted phenols. The inclusion of a non-ionic surface active agent seems to perform at least three functions in the dyebath. First, it acts to maintain the cationic agent and the dyestuff in dispersed form to prevent the formation and deposition of scums as mentioned above. Secondly, it accelerates the rate of transfer of the dyestuff near the boil from the basic nitrogenous fibers of the acrylic fibers thus decreasing the time required at the boil to achieve union dyeing. Lastly, the non-ionic agent increases the penetration of yarns and fabrics to achieve even dyeing of all fibers, both in the interior and on the surface of a skein or fabric. Therefore, I find it preferable to include in the dyebath for use in my process a nonionic surface active agent chosen from the group described above. For purposes of insuring against the formation and deposition of scum I prefer to add the nonionic surface active agent as the first ingredient in making up my dyebaths. An amount of one of the nonionic surface active agents described above of from about 0.5% to 100% based on the weight of the fibers being treated can be successfully employed in the dyebath. For reasons of economy and ease of solution I have found it preferable to include from about 0.5% to about 5.0% of a nonionic surface active agent.

In carrying out my process I make up the dyebath with the desired amount of nonionic surface active agent, if it is to be included, the desired amount of cationic surface active agent, the selected amount of wool dyestuff, and sufficient of an acid to adjust the pH of the dyebath to the range required by the various classes of wool dyestuffs as more fully set forth below. The dyebath is then heated slowly to a temperature of between about 190° F. and about 210° F. The fibers may be entered into the bath at any temperature from about 70° to about 160° F. The dyebath is then maintained from about 190° to about 210° F. for a period of from one to six hours to secure level union dyeing of the fibers. I have generally found that such level union dyeing may be secured in periods of from about two to four hours.

The acid employed in making up the dyebath for my process is generally sulfuric acid. However, both formic and acetic acid may be used when the dyestuff employed is from the class of pre-metallized neutral dyes. When employing one of the other classes of wool dyes such as the level dyeing acid dyes, the chrome dyes, the metallized dyes, and the weak acid dyes, the dyebath is adjusted to a pH of from about 1.5 to about 3.5. For these types of wool dyes, I prefer to adjust the pH of the bath to about 2.0. When a dyestuff from the class of neutral pre-metallized dyes is employed, the dyebath may be adjusted to a pH of from about 5.0 to about 7.0, but preferably to a pH of 5.5. For making this higher pH adjustment formic and acetic acids may be used as well as sulphuric acid, as pointed out above. If desired, the higher pH may be initially produced by ammonium salts of these acids, such as ammonium sulfate or ammonium acetate, and thereafter maintained by additions of one of the acids. I have found that my process is suitable for use with all of the common classes of wool dyestuffs, including level dyeing acid dyes, chrome dyes, metallized acid dyes, weak acid dyes, and pre-metallized neutral dyes. Though every individual dye from each of the enumerated classes does not function to dye union shades in every case, a majority of the dyes in each class do so function and it is a simple matter to determine the amounts and identity of individual dyestuffs within the enumerated classes in the same manner as is done with union dyeings of all wool yarns and fabrics.

Furthermore, I have found that successful union dyeing may be accomplished on blends of acrylic fibers with wool fibers, acrylic fibers with regenerated protein fibers, acrylic fibers with polyamide fibers, acrylic fibers, wool fibers, and polyamide fibers, and acrylic fibers, wool fibers, and regenerated protein fibers. Blends of the above-named fibers may be dyed either as yarn in the skein or as fabric.

My new process possesses many advantages over the processes of the prior art. The chief advantage lies in the ability to union dye to deep, fast shades blends of acrylic fibers with all common basic nitrogenous fibers, heretofore union dyed in light shades only with difficulty and impossible to union dye in dark shades. Furthermore, this advantageous result can be achieved with all of the commonly used classes of wool dyes. Furthermore, these advantageous results are realized by the use of normal one-bath wool dyeing procedures, requiring only the addition of a cationic surface active agent and preferably a nonionic surface active agent to the normal wool dye bath. There is no necessity for modification of wool dyeing equipment since generally the same temperatures and volumes of dyebaths are successfully employed in my process.

The application of my invention is more particularly set out and described in the examples below.

Example I

There was dissolved 0.2 part of a level-dyeing blue wool dye (C.I. Acid Blue 45; C.I. 63010) in 400 parts of water. This was sufficient for a 2% dying of a fabric containing 10 parts of a blend of equal weights of wool and an acrylic fiber containing 89% acrylonitrile and 6% of a vinylpyridine. The following agents were then added to the dyebath in the order listed, the percentages being based on the weight of the fabrics:

|  | Percent |
|---|---|
| Non-ionic surface active agent (polyoxyethylated fatty acid) | 5.0 |
| Cationic surface active agent (35% solution of N-cetyl-N-ethyl-morpholinium ethosulfate) | 10.0 |
| Sulfuric acid (sp. gr. 1.84) | 6.0 |

The scoured, wet-out fabric was entered in the cold, the dyebath brought up to the boil in 20 to 30 minutes, and kept there three hours. Care was taken to turn the fabric frequently during the initial heating period and for 15 minutes after the boil was reached. Thereafter occasional turnings of the fabric were sufficient to produce an even dyeing. After 3 hours the fabric was removed, rinsed in warm water, and dried.

This dyeing described in this example produced an even dyeing of good fastness of both fiber components in the blend upon microscopic examination. There was no formation of scum in the dyebath and penetration into the interior of the yarns was effective to level dye all fibers.

Example II

A dyeing was made according to Example I except 0.2 part of a chromable red dye (C.I. Acid Red 14; C.I. 14720) was used, together with the following agents:

|  | Percent |
|---|---|
| Sulfuric acid | 6.0 |
| Cationic agent (dodecyl guanidine bicarbonate condensed with ethylene oxide) | 3.0 |

At the end of three hours boiling the fabric was removed, rinsed lightly in cold water and placed in a fresh bath containing

|  | Percent |
|---|---|
| Potassium dichromate | 2.0 |
| Glacial acetic acid | 5.0 | in 400 parts of water. The bath was brought to the boil in about 30 minutes and kept there one hour. The fabric was removed, rinsed in warm water, and dried. This procedure resulted in an even dyeing of good fastness of both components as shown by microscopic examination.

Example III

Ten parts of fabric consisting of approximately 45% of the same acrylic fiber described in Example I above, 45% wool, and 10% filament nylon were wet-out at 120° in a solution containing 2 percent non-ionic surface active agent (polyoxyethylated fatty alcohol). The following dyestuffs and agents, dissolved in water, were then added to the bath, the percentages being based on the weight of the fabric:

|  | Percent |
|---|---|
| Neolan Blue 2R (C.I. Acid Blue 154) | 5.00 |
| Neolan Dark Green B (C.I. Acid Green 35; C.I. 13361) | 0.60 |
| Neolan Bordeaux BE (C.I. Acid Red 212) | 1.50 |
| Neolan Orange R (C.I. Acid Orange 76; C.I. 18870) | 0.30 |
| Cationic agent (stearic amide condensed with ethylene oxide) | 3.0 |
| Formic acid (85%) | 4.0 |

Sufficient water was added to the dyebath to make a total of 400 parts of water. The dyebath was brought to the boil in about 30 minutes and kept there 30 minutes. At the end of 30 minutes of boiling, the dyebath was brought up to its original volume by the addition of water, and 4% sulfuric acid (sp. gr. 1.84) was added. Boiling was continued for 30 minutes, at the end of which time 4% sulfuric acid (sp. gr. 1.84) was added, and the dyebath boiled an additional two hours. The fabric was removed, rinsed in warm water, and dried.

The dyeing described in this example produced an even dyed shade of gray of good fastness in all three fiber components of the blended fabric. Microscopic examination revealed no differences in shade between the three fibers and penetration of all yarns was excellent.

Example IV

There was dissolved 0.2 part of neutral-dyeing premetallized wool dye (Cibalan Blue 3 GL, C.I. Acid Blue 171) in 400 parts of water. This was sufficient for a 2% dyeing of a fabric containing 10 parts of a blend of equal weights of the same acrylic fiber described in Example I above and wool. The following agents were then added to the dyebath, the percentages being based on the weight of the fabric:

|  | Percent |
|---|---|
| Non-ionic agent (polyoxyethylated fatty alcohol) | 2.0 |
| Ammonium sulfate | 10.0 |

The scoured, wet-out fabric was entered at 120°, the dyebath was raised to the boil in about 15 minutes and kept there 105 minutes. At the end of this time the dyebath was brought up to its original volume by the addition of water and 3% cationic agent (20% solution of oleyl amine condensed with ethylene oxide) was added. The boiling was continued 3 hours after which the fabric was removed, rinsed in water and dried. Microscopic examination revealed an even dyeing of both fiber components with good fastness properties.

Example V

A dyeing was made according to Example III except 0.2 part of a weak-acid type wool dye (C.I. Acid Black 48) was used, together with the following agents:

|  | Percent |
|---|---|
| Non-ionic agent (polyoxyethylated fatty alcohol) | 2.0 |
| Cationic agent (20% solution of oleyl amine condensed with ethylene oxide) | 3.0 |
| Formic acid (85%) | 2.0 |

The fabric consisted of a blend of equal weights of the same acrylic fiber described in Example I and wool. An even dyeing of both fiber components resulted.

Example VI

There was dissolved 0.2 part of a neutral-dyeing premetallized wool dye (Cibalan Blue 3 GL, C.I. Acid Blue 171) in 400 parts of water. This was sufficient for a 2% dyeing of a fabric consisting of 10 parts of a blend of equal weights of the same acrylic fiber described in Example I and wool. The following agents were then added to the bath, the percentages being based on the weight of the fabric:

| | Percent |
|---|---|
| Non-ionic surface active agent (polyoxyethylated fatty alcohol) | 4.0 |
| Sulfuric acid (sp. gr. 1.84) | 0.25 |

The scoured, wet-out fabric was entered at 80° F., the dyebath temperature was raised to 180° in 10–15 minutes, and 0.25% sulfuric acid (sp. gr. 1.84) was added. The dyebath was brought to the boil and kept there 90 minutes. Additions of 0.25% sulfuric acid were made to the bath at the boil, and after 30 minutes at the boil; and 1.0% sulfuric acid was added after one hour at the boil. At the end of this time 1.0% cationic surface active agent (35% solution of N-cetyl-N-ethyl-morpholinium ethosulfate) was added and the dyebath was boiled an additional 2 hours. The fabric was removed, rinsed and dried. Microscopic examination revealed that an even dyeing and excellent penetration of the yarns had resulted. The level dyed fabric possessed good fastness properties.

Example VII

A dyeing was made according to Example I except 0.4 part of a metallized acid dye (Calcofast Wool Blue R) was used, together with the following agents:

| | Percent |
|---|---|
| Non-ionic surface active agent (polyoxyethylated fatty alcohol) | 2.0 |
| Cationic surface active agent (35% solution of N-cetyl-N-ethyl-morpholinium ethosulfate) | 3.0 |
| Sulfuric acid (sp. gr. 1.84) | 8.0 |

This was sufficient for a 4% dyeing of a skein of yarn composed of 10 parts of a blend of equal weight of wool and an acrylic fiber containing 89% acrylonitrile and 6% of a vinylpyridine. An even dyeing of good fastness resulted with excellent penetration of each yarn.

Example VIII

Ten parts of fabric consisting of approximately 75% of the same acrylic fiber described in Example I and 25% regenerated protein fiber were wet-out at 120° in a solution containing 4 percent non-ionic surface active agent. The following dyestuffs and agents, dissolved in water, were then added to the bath, the percentages being based on the total weight of the fabric:

| | Percent |
|---|---|
| Vitrolan Black WA (C.I. Acid Black 52; C.I. 15711) | 7.0 |
| Neolan Blue 2G (C.I. Acid Blue 158A; C.I. 15050) | 1.0 |
| Vitrolan Orange R (C.I. Acid Orange 76; C.I. 18870) | 0.30 |
| Formic acid (85%) | 4.0 |
| Cationic agent (20% solution of oleyl amine condensed with ethylene oxide) | 5.0 |

Sufficient water was added to the dyebath to make a total of 400 parts of water. The dyebath was brought to the boil in about 30 minutes and kept there 30 minutes. At the end of 30 minutes of boiling the dyebath was brought up to its original volume by the addition of water, and 5% sulfuric acid (sp. gr. 1.84) was added. Boiling was continued 30 minutes, at the end of which time 5% sulfuric acid (sp. gr. 1.84) was added, and the dyebath boiled an additional two hours. The fabric was removed, rinsed in warm water and dried.

The dyeing described in this example produced an even dyeing of good fastness of both fiber components in the blend upon microscopic examination. There was no formation of scum in the dyebath and penetration into the interior of the yarns was effective to level dye all fibers.

The polymeric materials utilized in the process of this invention may be produced by any of the known polymerization procedures. The filaments, fibers or yarns of acrylic fibers may be produced by either the wet, dry, or melt spinning technique. The blends of acrylic fibers with the basic nitrogenous fibers mentioned above may be in the form of yarns in the skein or fabrics produced by any of the known spinning and weaving processes.

I claim:

1. A method of union dyeing blends of fibers comprising acrylonitrile fibers of blended polymers containing at least 80% by weight acrylonitrile in polymeric form and from 2 to 10% of a vinylpyridine in polymeric form with other basic nitrogenous fibers selected from the group consisting of wool fibers, regenerated protein fibers, polyamide fibers, and mixtures thereof which comprises subjecting the blend to the action of a dyebath containing a wool dye selected from the group consisting of level dyeing acid dyes, chrome dyes, metallized acid dyes, weak acid dyes, and pre-metallized neutral dyes, sulphuric acid, a cationic surface active agent and a non-ionic surface active agent selected from the group consisting of condensation products of polyglycols with higher fatty acids, condensation products of polyglycols with higher fatty alcohols, condensation products of polyglycols with amides of higher fatty acids, and condensation products of polyglycols with long-chain alkyl substituted phenols.

2. A method according to claim 1 in which the wool type dye is a pre-metallized neutral dye.

3. A method of union dyeing blends of fibers comprising acrylonitrile fibers of blended polymers containing at least 80% by weight acrylonitrile in polymeric form and from 2 to 10% of a vinylpyridine in polymeric form with other basic nitrogenous fibers selected from the group consisting of wool fibers, regenerated protein fibers, polyamide fibers, and mixtures thereof which comprises subjecting the blend to the action of a dyebath containing a wool dye selected from the group consisting of level dyeing acid dyes, chrome dyes, metallized acid dyes, weak acid dyes, and pre-metallized neutral dyes, sulphuric acid, a cationic surface active agent and a non-ionic surface active agent selected from the group consisting of condensation products of polyglycols with higher fatty acids, condensation products of polyglycols with higher fatty alcohols, condensation products of polyglycols with amides of higher fatty acids, and condensation products of polyglycols with long-chain alkyl substituted phenols, at a temperature of about 190° F. to about 210° F. for from about one to about six hours.

4. A method according to claim 3 in which the basic nitrogenous fibers are wool.

5. A method according to claim 3 in which the basic nitrogenous fibers are regenerated protein fibers.

6. A method according to claim 3 in which the basic nitrogenous fibers are polyamide fibers.

7. A method according to claim 3 in which the basic nitrogenous fibers are mixtures of wool and polyamide fibers.

8. A method according to claim 3 in which the basic nitrogenous fibers are mixtures of wool and regenerated protein fibers.

9. A method according to claim 3 in which the wool type dye is a level-dyeing acid dye.

10. A method according to claim 3 in which the wool type dye is a chrome dye.

11. A method according to claim 3 in which the wool type dye is a metallized acid dye.

12. A method according to claim 3 in which the wool type dye is a weak acid dye.

13. A method of union dyeing blends of fibers comprising acrylonitrile fibers of blended polymers containing at least 80% by weight acrylonitrile in polymeric form and from 2–10% of a vinylpyridine in polymeric form with wool fibers, which comprises subjecting the blend to the action of a dyebath containing a wool dye, sulfuric acid, a cationic surface active agent, and a nonionic surface active agent, said surface active agents being present in the ratio of one part cationic to from about 5 to about 10 parts nonionic surface active agent.

References Cited in the file of this patent

UNITED STATES PATENTS

| | | |
|---|---|---|
| 2,083,181 | Zweifel | June 8, 1937 |
| 2,228,369 | Schoeller | Jan. 14, 1941 |
| 2,254,965 | Kling | Sept. 2, 1941 |
| 2,336,221 | Burchill | Dec. 7, 1943 |
| 2,628,152 | Meunier | Feb. 10, 1953 |
| 2,746,836 | Rossin | May 22, 1956 |

FOREIGN PATENTS

| | | |
|---|---|---|
| 526,760 | Great Britain | Sept. 25, 1940 |